Oct. 22, 1968  J. D. TOUSSAINT  3,406,797
CRISS CROSS GUIDES FOR A LATCH OPERATED CLUTCH
Filed May 17, 1967  2 Sheets-Sheet 1

INVENTOR
Joseph Dominicus Toussaint

Oct. 22, 1968  J. D. TOUSSAINT  3,406,797
CRISS CROSS GUIDES FOR A LATCH OPERATED CLUTCH
Filed May 17, 1967  2 Sheets-Sheet 2

INVENTOR
Joseph Dominicus Toussaint 3,406,797
CRISS CROSS GUIDES FOR A LATCH
OPERATED CLUTCH
Joseph D. Toussaint, Rheden, Gueldre, Netherlands, assignor to American Enka Corporation, Enka, N.C., a corporation of Delaware
Filed May 17, 1967, Ser. No. 639,215
Claims priority, application Netherlands, May 18, 1966, 6606805
5 Claims. (Cl. 192—27)

ABSTRACT OF THE DISCLOSURE

A shaft coupling for connecting one rotatable shaft to another coaxial rotatable shaft which comprises a first coupling half connected to the said one shaft and a second coupling half connected to the coaxial shaft, a biased control means rotatable with the two coupling halves, and one or more coupling members which when in the coupled position are in contact with the two coupling halves and when in the uncoupled position with only one of the two halves and which when turned under the biasing action of said control means can be moved from one position to the other, said coupling members being movable through guide means in one of the coupling halves, and said control means comprising a control element having control guide means co-operating with the coupling members and being so constructed that together with the guide means provided in one of the two coupling halves, a crossing guide means for the coupling members is formed.

---

This invention relates to a shaft coupling for connecting one shaft to another coaxial shaft and more particularly to a shaft coupling having one or more coupling members between two halves or portions of the coupling and a control arrangement or means for allowing movement of the coupling members directly from the uncoupled position to the coupled position so that a slip free transmission of the drive couple between the two coupling halves is ensured.

Shaft couplings similar to the type described herein are generally known and one such coupling is shown in British patent specification No. 15,316 (A.D. 1910). This known coupling when used as a shaft coupling for metering pumps, for instance, the gear wheel type of spinning pump which forms a part of the apparatus for the spinning of synthetic yarns and threads, has certain disadvantages. For example, during the initial period just after the coupling has been engaged (when the shaft to be driven is already rotating) the coupling members provided in the known coupling device have not yet taken up their positions in the recesses provided for a slip-free power transmission. During this initial period, which may be relatively long, the driving moment of one-half of the coupling is communicated to the other half, by friction between the coupling members and the one coupling half. However, when a small variation in the load of the pumpshaft occurs during this initial period, the friction between the coupling members and the coupling halves is insufficient, so that slip occurs and the two coupling halves rotate relative to each other. It often takes a number of slip shocks before the coupling members take up the positions required for a slip-free transmission. These slip shocks give rise to fluctuations in the outputs of the metering pumps, so that the pumps temporarily do not accurately meter. Particularly, in the case of gear wheel spinning pumps, the slip shocks lead to substantial variations in the denier of the spun threads. Consequently, the resulting threads and the articles made therefrom are of relatively low quality. Moreover, in further processing of these threads or yarns of irregular denier, difficulties may be encountered which give rise, inter alia, to considerable losses of production.

Advantageously, the shaft coupling of this invention does not have the drawbacks of the known coupling device.

Thus this invention contemplates a shaft coupling for connecting one rotatable shaft to another coaxial rotatable shaft which comprises a first coupling half connected to the said one shaft and a second coupling half connected to the coaxial shaft, a biased control means rotatable with the two coupling halves, and one or more coupling members which when in the coupled position are in contact with the two coupling halves and when in the uncoupled position with only one of the two halves and which when turned under the biasing action of said control means can be moved from one position to the other said coupling members being movable through guide means in one of the coupling halves and said control means comprising a control element having control guide means co-operating with the coupling members and being so constructed that together with the guide means provided in one of the two coupling halves a crossing guide means for the coupling members is formed.

Upon inter-engaging the two coupling halves the crossing guide means permits the coupling members which are preferably formed by four rollers to be shifted directly to their terminal positions where they will lie in recesses provided to ensure a slip-free transmission of the driving couple. When the shaft coupling according to the invention was by way of experiment, used in the gear wheel type of spinning pumps, the threads obtained were found to be free of the highly objectionable denier variations.

One embodiment of the shaft coupling of the invention which is provided with operating members that may co-operate with the control means, is characterized in that the rotatable control element is substantially disk-shaped and is connected to the coupling half provided with guide means for the coupling members by a pin-and-slot-connection and in that a spring is positioned in the slot which co-operates with the pin.

A shaft coupling, in which the guide means for the coupling members in the one coupling half are substantially formed by guide slots positioned obliquely relative to the radial direction, is according to the invention, advantageously characterized in that the control guide means are formed by control slots in the control element. These slots are positioned substantially oppositely and obliquely relative to the guide slots in the one coupling half and are arranged so that they form the crossing guide means with the guide slots.

Preferably, the control element and the coupling half having guide means for the coupling members are on their circumferences provided with grooves, projections, or the like, which may co-operate with operating members positioned outside of the coupling halves.

A preferred embodiment of the shaft coupling of the invention is characterized in that the operating members comprise a main hook and at least one auxiliary hook that are pivotally mounted and interconnected by means of a spring. For the purpose of uncoupling the shafts, the main hook co-operates with a groove, projection of like engaging means in the control element or disk and the auxiliary hook co-operates with a groove, projection or like engaging means in one coupling half after a relative angular displacement of the control disk and the one coupling half.

The invention will be further described with reference to the accompanying drawing in which.

Figure 1:
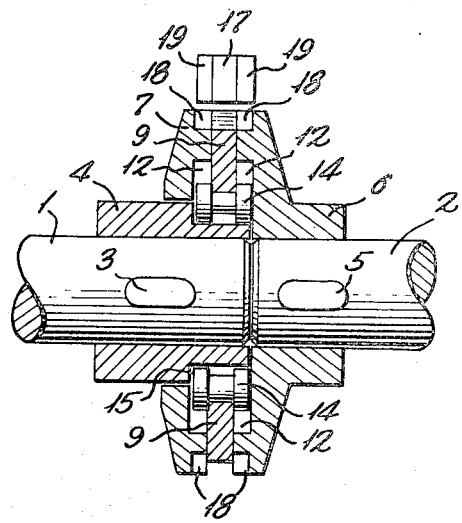
FIGURE 1 shows a section, in the axial direction, of the shaft coupling of the invention in its coupled position.

In FIGURE 1, the reference numerals 1 and 2, respectively, designate a driving shaft and a coaxial driven shaft to be coupled therewith. Mounted on the driving shaft 1 with the aid of a key 3 is a sleeve 4, which forms one half of the shaft coupling of the invention. Mounted on the driven shaft 2, with the aid of a key 5, is a sleeve 6, which together with a ring 7 forms the other half of the coupling. As shown in FIGURE 1, the sleeve 6 and the ring 7 are interconnected by means of four hollow pins 8. Positioned between the sleeve 6 and the ring 7 is a control disk 9 which forms a control arrangement rotatable with the two halves of the coupling. In the control disk 9 there are four slots 10, in which the pins 8 fit. Each of these pins co-operate with a spring 11 also provided in each slot. The sleeve 6 and the ring 7 each have, on either side of the control disk 9, four guide slots 12, which are positioned obliquely relative to the radial direction. In the control disk 9 there are four control slots 13 which are positioned substantially oppositely and obliquely relative to the guide slots 12. In this arrangement, the slots 12 and 13 together form a crossing guide or guide means for the four rollers 14 forming the coupling members. In the sleeve 4 of the driving half of the coupling there are provided four coupling grooves or recesses 15 for receiving the rollers 14 when the shaft coupling is in its coupled position. On the circumference of the control disk 9 four grooves 16 of which—for the purpose of uncoupling the shafts—one groove can always co-operate with a pivoted main hook lever 17. Also the ring 7 and the sleeve 6 are on their circumferences, each provided with four grooves 18, which—for the purpose of uncoupling the shafts—co-operate with auxiliary hooks 19.

Figure 3:
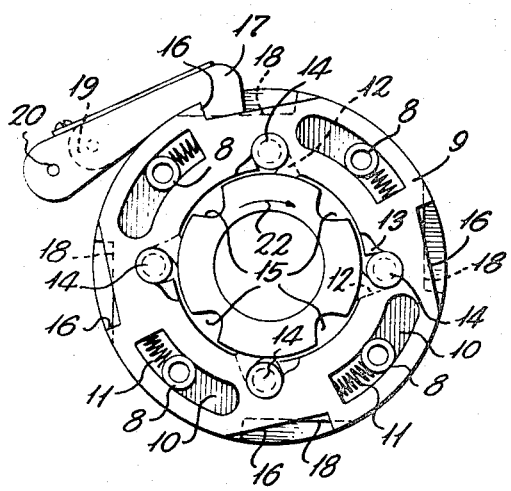
FIGURE 3 is a cross-sectional view of the shaft coupling in its uncoupled position.
Figure 2:
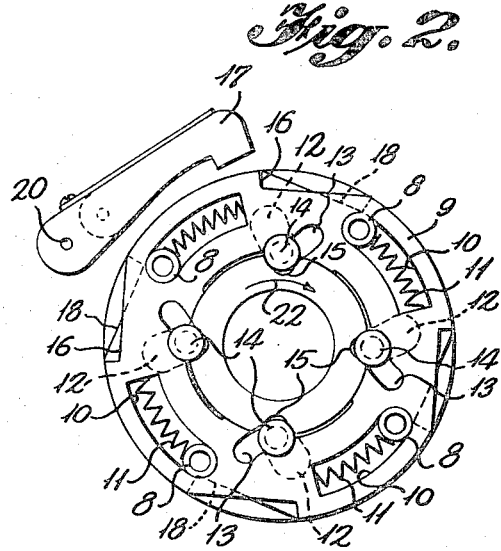
FIGURE 2 is a cross-sectional view of the coupling shown in FIGURE 1.

Mounted on a support (not shown) the main hook 17 may, free from the two halves of the coupling, pivot about a point designated by reference numeral 20 so that the hook can be turned from the position in FIGURE 2 to the position in FIGURE 3. The auxiliary hooks 19 with the main hook lever 17 form members for operating the coupling. Attached to the main hook 17 is a leaf spring 21 which, after turning of the main hook 17, tends to move the auxiliary hooks 19 in the same direction and to the same angular position.

The operation of the shaft coupling according to the invention is as follows:

The driving shaft 1 is rotated, for instance, by a motor (not shown) in the direction indicated by an arrow 22, and (in the coupled position shown in FIGURES 1 and 2) the driven shaft 2 is rotated in the same direction. In the coupled position the coupling rollers 14 are retained at one end in the coupling grooves 15 of the driving shaft 1 and at the other end in the guide slots 12 and the control slots 13. This arrangement causes a driving couple to be imparted from the driving half of the coupling to the driven half of the coupling. The coupling is free from play and does not slip.

The rollers 14 are kept in the coupled position by the control slots 13 in the control disk 9 and the slots are retained in the position shown in the drawing by the springs 11 and the pins 8.

Figure 4:
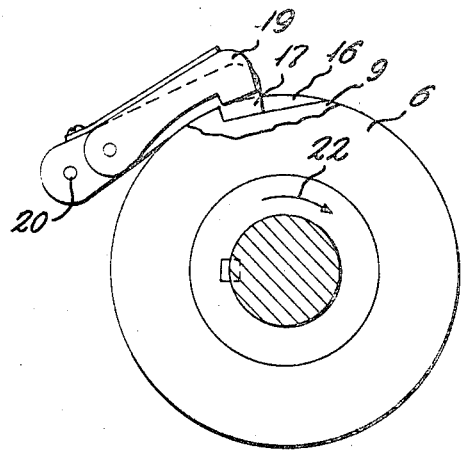
FIGURE 4 shows the operating hooks of the shaft coupling in a semi-uncoupled position.

Uncoupling of the shaft coupling is effected by turning the main hook 17 and the auxiliary hooks 19 in the direction of the rotating coupling, i.e., clockwise as shown in the drawing. The main hook 17 will then drop into the groove 16 provided in the control disk 9. Except for the disk 9, the rest of coupling continues to rotate and the springs 11 are compressed. The grooves 18 in the sleeve 6 and in the ring 7 begin to move in the direction of rotation. As illustrated in FIGURE 4, the hooks are then each in a semi-uncoupled position. At this time, the auxiliary hooks 19 rest on the outer circumference of the ring 7 and the sleeve 6, because the grooves 18 have not sufficiently turned.

Figure 6:
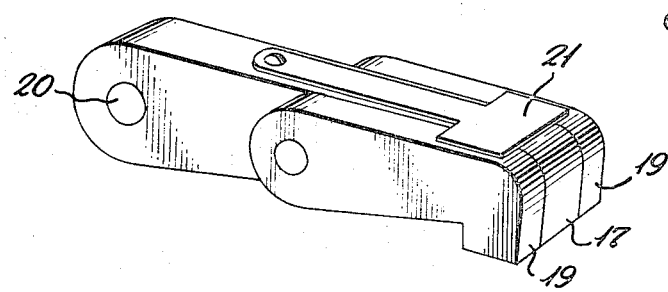
FIGURE 6 shows an embodiment of the operating hooks of the coupling in perspective.

When the coupling rotates a little further, the rollers 14 eventually take up their entirely uncoupled positions (see FIGURE 3), in which they are entirely free of the grooves 15 in the sleeve 4. The displacement of the coupling rollers 14 in a radially outward direction takes place through the oblique control slots 13 in the control disk 9 which co-operate with the oppositely oblique guide slots 12 in the sleeve 6 and the ring 7. The slots 12 and 13 then form a crossing guide. The auxiliary hooks 19 are forced into the grooves 18 by the leaf spring 21 which is attached to the main hook 17 positioned between the auxiliary hooks (see FIGURE 6).

Figure 5:
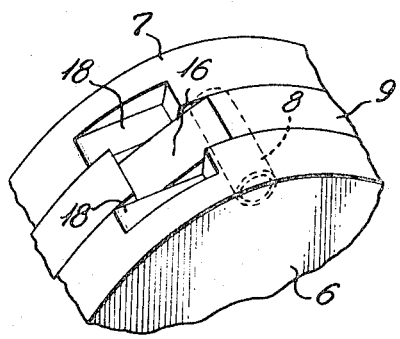
FIGURE 5 shows an embodiment of the grooves on the shaft coupling in perspective.

The control disk 9 can now no longer be rotated relative to the sleeve 6 and the ring 7 of the driven half of the coupling, so that the coupling rollers 14 remain in this position and the sleeve 4 of the driving half of the coupling can freely rotate under the coupling rollers 14. In this uncoupled position, the sleeve 6, the ring 7, and the shaft 2 driven thereby, are also retained by the hooks. FIGURE 5 is, by way of illustration, a perspective view of the relative positions of the grooves 16 and 18 in the uncoupled state.

For the purpose of again coupling the driving shaft 1 with the driven shaft 2, the main hook 17 and the auxiliary hook levers 19 are swung away from the two halves of the coupling. The springs 11 then force the control disk 9 in the direction of rotation of the driving shaft 1, so that the control slots 13, in co-operation with the guide slots 12, again force the coupling rollers 14 into the coupling grooves 15, and the coupling between the two shafts 1 and 2 is again established.

While the novel features of the invention have been shown and described and are pointed out in the appended claims, it is to be understood that various omissions, substitutions and changes in construction and arrangement of the features shown and described may be made by those skilled in the art without departing from the spirit and scope of the invention.

What is claimed is:

1. A shaft coupling for connecting one rotatable shaft to another coaxial rotatable shaft which comprises a first coupling half connected to the said one shaft and a second coupling half connected to the coaxial shaft, a biased control means rotatable with the two coupling halves, and at least one coupling member which when in the coupled position is in contact with the two coupling halves and when in the uncoupled position with only one of the two halves and which when turned under the biasing action of said control means can be moved from one position to the other, said coupling member being movable through guide means in one of the coupling halves, and said control means comprising a control element having control guide means co-operating with the coupling member and being so constructed that together with the guide means provided in one of the two coupling halves, a crossing guide means for the coupling member is formed.

2. The shaft coupling of claim 1 including operating members which are operatively associated with said biased control means to allow said coupling member to move from one position to the other, said control element being a substantially disk-shaped member and being connected to the coupling half provided with guide means for the coupling member by a pin-and-slot-connection, said connection comprising a slot formed in the disk-shaped member and a spring which co-operates with the pin.

3. The shaft coupling of claim 1, including a plurality of coupling members in the form of rollers, the guide means for the coupling members comprising guide slots positioned obliquely relative to the radial direction, and said control guide means being formed by control slots provided in the control element, said control slots being positioned substantially oppositely and obliquely relative to the guide slots in the one coupling half, whereby said control slots and said guide slots form the crossing guide means.

4. The shaft coupling of claim 2 in which the control element and the coupling half having guide means for the coupling member are provided on their circumferences with engaging means, which can co-operate with the operating members positioned outside the coupling halves.

5. The shaft coupling of claim 4 in which the operating members comprise a main hook and at least one auxiliary hook that are pivotally mounted and interconnected by a resilient member, said main hook co-operating with an engaging means in the control element and the auxiliary hook co-operating with an engaging means in the one coupling half after a relative angular displacement of the control element and the one coupling half.

References Cited

UNITED STATES PATENTS

| | | | |
|---|---|---|---|
| 2,017,132 | 10/1935 | Ricci | 192—27 X |
| 2,466,500 | 4/1949 | Spaine | 192—27 |
| 3,108,670 | 10/1963 | Habicht | 192—27 |

FOREIGN PATENTS 147,245  7/1954  Sweden.

MARTIN P. SCHWADRON, *Primary Examiner.*

C. LEEDOM, *Assistant Examiner.*